United States Patent [19]
Kanda

[11] Patent Number: 5,915,660
[45] Date of Patent: Jun. 29, 1999

[54] SEAT SLIDE APPARATUS

[75] Inventor: Yoshihiro Kanda, Kosai, Japan

[73] Assignee: Fujikiko KabushikiKaisha, Tokyo, Japan

[21] Appl. No.: 08/773,371

[22] Filed: Dec. 26, 1996

[30] Foreign Application Priority Data

Dec. 29, 1995 [JP] Japan ................................. 7-353716
Dec. 29, 1995 [JP] Japan ................................. 7-353761

[51] Int. Cl.$^6$ ................................................ F16M 13/00
[52] U.S. Cl. ........................................ 248/430; 248/429
[58] Field of Search .................................. 248/424, 429, 248/430, 419

[56] References Cited

U.S. PATENT DOCUMENTS

| | | | |
|---|---|---|---|
| 4,533,107 | 8/1985 | Okazaki et al. ................. | 248/430 |
| 4,602,758 | 7/1986 | Mann et al. ..................... | 248/430 |
| 5,137,244 | 8/1992 | Negi ............................... | 248/430 |
| 5,529,397 | 6/1996 | Yoshida .......................... | 248/430 |
| 5,582,381 | 12/1996 | Graf et al. ...................... | 248/430 |

*Primary Examiner*—Ramon O. Ramirez
*Assistant Examiner*—Gwendolyn Baxter
*Attorney, Agent, or Firm*—Howard & Howard

[57] ABSTRACT

A novel seat slide apparatus comprising a lower rail mounted on the vehicle body and an upper rail having a substantially inverted-T section is disclosed, which is formed by folding a single plate member. The upper rail includes a lower upper flange with the lower surface thereof slidably supported on the lower rail through at least a roll member and a seat coupler extending upward substantially from the central portion along the width of the upper flange and adapted to be mounted on the vehicle seat.

17 Claims, 18 Drawing Sheets

SEAT SLIDE APPARATUS

BACKGROUND OF THE INVENTION

The present invention relates to a seat slide apparatus for automotive seats.

A seat slide apparatus comprises a lower rail mounted on the automotive vehicle body along the longitudinal direction thereof. An upper rail is arranged slidably along the lower rail with the upper side thereof, and mounted on the seat. An inverted-T upper rail with the portions mounted on the seat integrated with each other has recently been introduced to reduce cost.

This conventional upper rail is configured of two overlaid plate members, and comprises a portion mounted on the seat and an upper flange including substantially L-shaped portions bent in opposite directions from the lower ends of the seat-mounting portion.

In the conventional upper rail, the two mounting portions must be laid one over the other and firmly coupled to each other by welding or the like means, thereby complicating the manufacturing process while at the same time increasing the manufacturing cost.

SUMMARY OF THE INVENTION

The present invention has been developed to obviate the above-mentioned problems of the conventional apparatus. The object thereof is to provide a seat slide apparatus comprising an upper rail which can be manufactured in a simplified process with a lower cost.

To achieve the above-mentioned object, according to one aspect of the present invention, there is provided a seat slide apparatus comprising a lower rail mounted on the vehicle body. An upper rail includes a lower upper flange having a substantially inverted-T section formed of a single bent plate member with the lower side thereof slidably supported on the lower rail through roll members. The upper rail also includes a seat coupler extending upward substantially from the central portion along the width of the upper flange and mounted on the seat.

With this configuration, the upper rail is formed by bending a single sheet plate member. Therefore the manufacturing process of the upper rail thus can be simplified and the cost thereof reduced.

According to a second aspect of the invention, there is provided a seat slide apparatus, in which the upper flange has a continuous flat lower surface.

With this second configuration, the continuous flat lower surface of the upper flange being in sliding contact with roll members can improve the slidability of the upper rail with respect to the roll members.

According to a third aspect of the invention, there is provided a seat slide apparatus, wherein the seat coupler of the upper rail is made of a single plate member folded into two opposed wall portions by being bent along a crease. The plate member, in an unfolded state, has a notch formed offset toward one of the wall portions away from the extension of the bending crease between the two wall portions. Thus, when the plate member is folded, a protrusion mountable on the seat is formed as the upper part of one of the opposed wall portions protruded above the other wall portion.

With this configuration, an upper rail is formed of a single plate member which, in an unfolded state, has a notch offset toward one of the walls from the extension of a bending crease between the two wall portions. Thus, when the plate members is folded, the upper portion of one of the opposed walls is protruded upward above the other wall portion and constitutes a seat-mounting protrusion that can be mounted on the seat. As a result, the scrap is considerably reduced and the yield of the plate member can be improved remarkably.

According to the fourth aspect of the invention, there is provided a seat slide apparatus, in which the two opposed wall portions can be coupled by a plastic coupling process.

With this configuration, the two wall portions of an upper rail in a folded state can be coupled to each other in press work. The upper rail, therefore, can be manufactured without any fixing process, such as welding, for a reduced manufacturing cost.

According to a fifth aspect of the invention, there is provided a seat slide apparatus, in which the lower rail includes guide members extending longitudinally along the two sides perpendicular to the width of the lower rail. Curled portions are in sliding contact with the inner surfaces of the guide members, respectively, along the two sides perpendicular to the width of the upper flange.

With this configuration, the provision of the curled portions of the upper rail eliminates the lateral and longitudinal loosening of the upper rail with respect to the lower rail. Therefore, balls, a retainer or the like are not necessary for preventing loosening, thereby reducing the cost.

According to a sixth aspect of the invention, there is provided a seat slide apparatus, in which each curled portion has a plurality of protrusions formed at regular longitudinal intervals for sliding contact with the lower rail.

With this configuration, the protrusions formed at regular spatial intervals along the longitudinal direction for sliding contact with the lower rail reduce the sliding resistance of the upper rail against the lower rail, and therefore the slidability of the upper rail is improved.

According to a seventh aspect of the invention, there is provided a seat slide apparatus, in which the seat coupler includes an internal space.

With this configuration, the internal space of the seat coupler of the upper rail can improve the lateral rigidity of the upper rail.

According to an eighth aspect of the invention, there is provided a seat slide apparatus, in which the upper flange has a longitudinally extending internal space.

With this configuration, the internal space formed in the upper flange of the upper rail can attach a spring-back to the roll members thereby to prevent the loosening of the roll members.

According to a ninth aspect of the invention, there is provided a seat slide apparatus, in which a notch is formed offset toward one of the two wall portions, and away from the extension of a bending crease between the two wall portions is formed in a plate member in an unfolded state. Thus, when the plate member is folded, an upper portion of the other walls in opposed relation to the first wall is protruded upward beyond the first wall portion thereby to form a protrusion mountable on a seat lifter.

According to a tenth aspect of the invention, there is provided a seat slide apparatus, in which the upper flange is coupled in two layers.

With this configuration, the strength is improved and the thickness of the plate member can be minimized for a reduced weight.

DESCRIPTION OF THE PREFERRED EMBODIMENTS

Embodiments of the invention will be described below with reference to the accompanying drawings.

Figure 1:
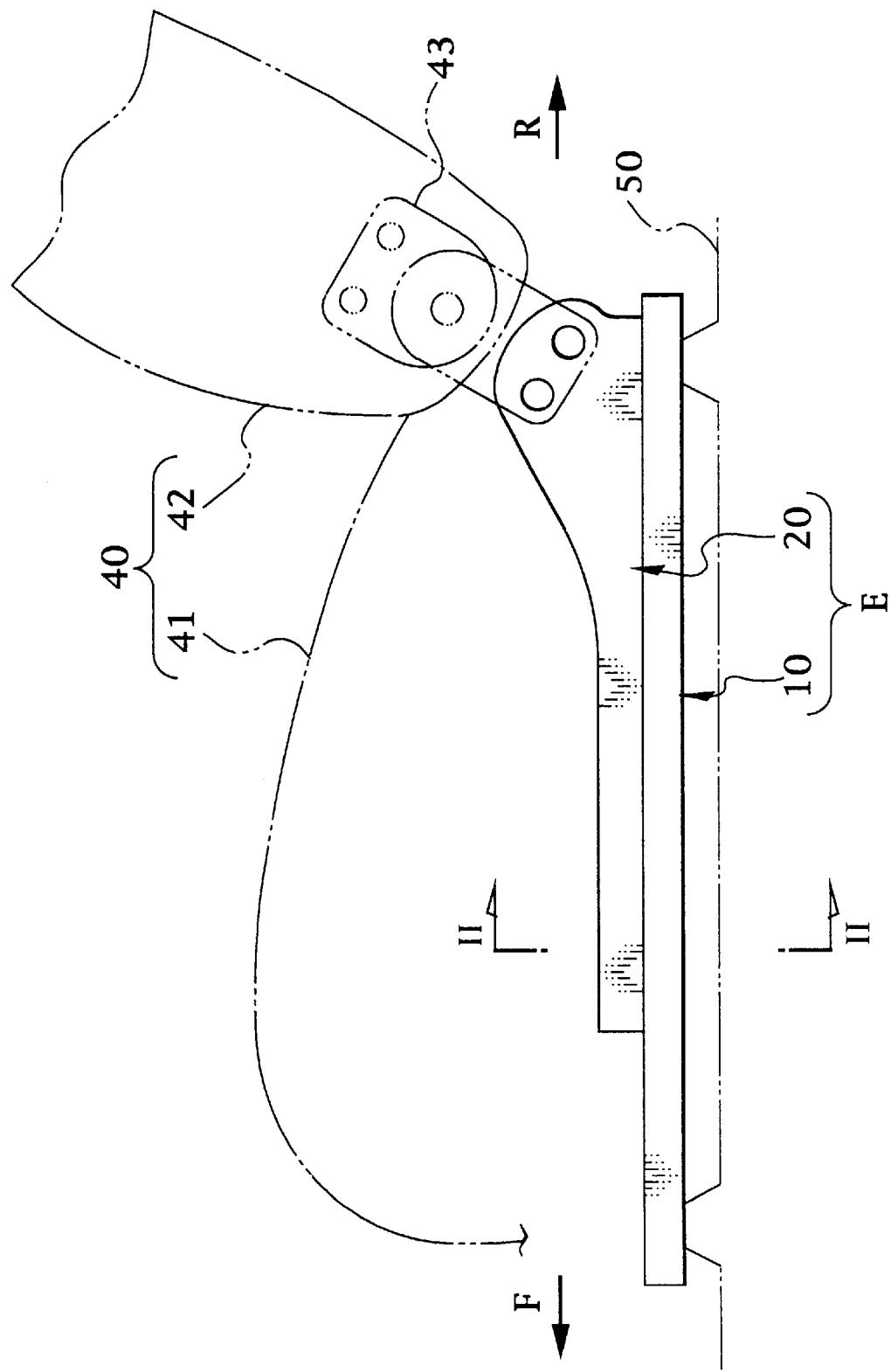
FIG. 1 is a side view showing a seat slide apparatus according to a first embodiment of the present invention.
Figure 2:
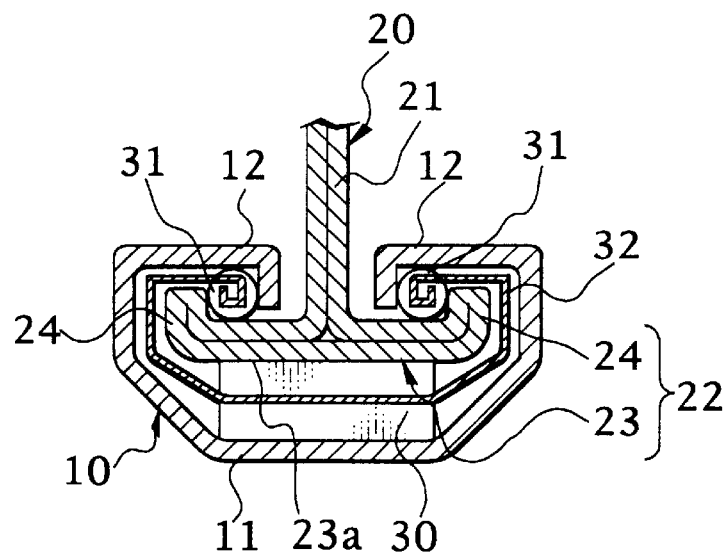
FIG. 2 is a sectional view taken in line II—II in FIG. 1.
Figure 3:
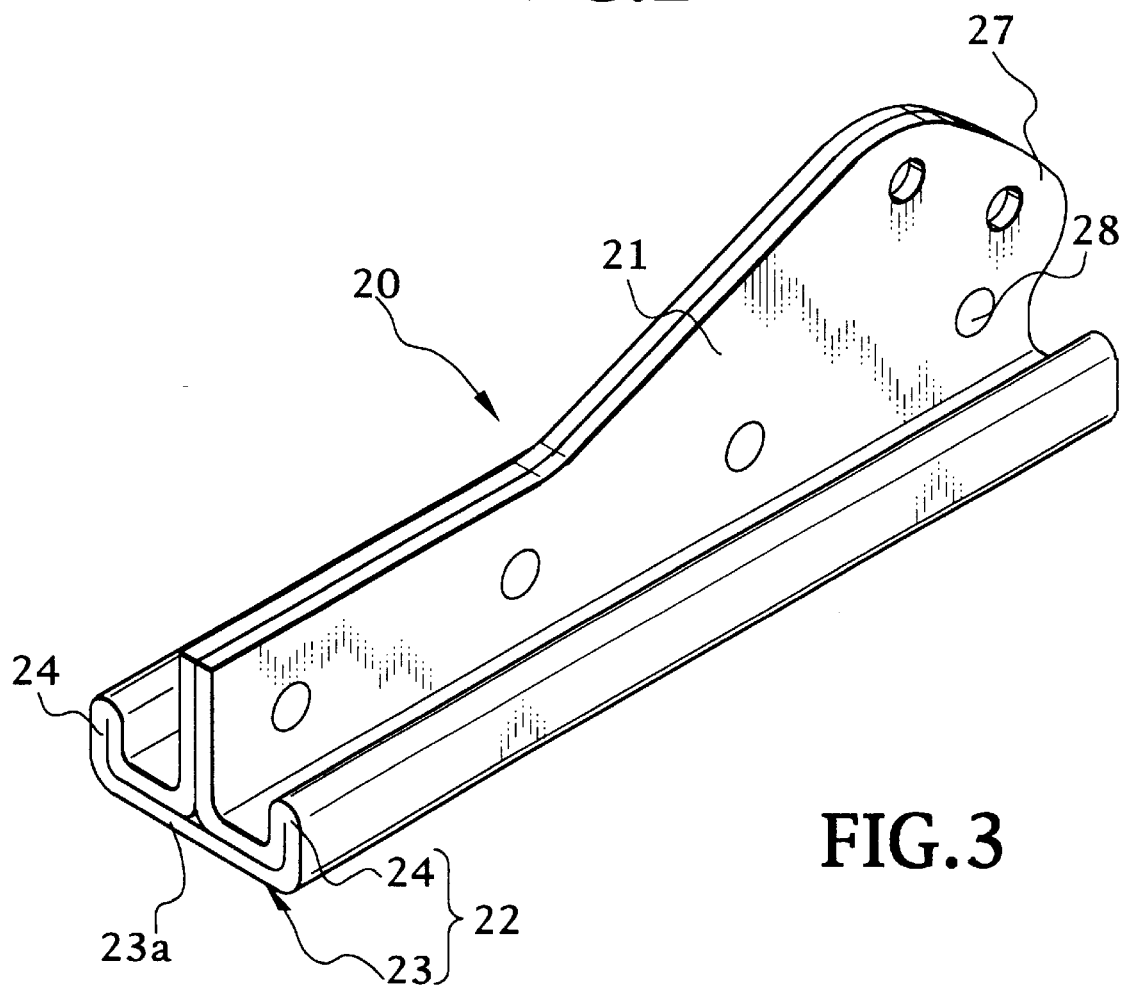
FIG. 3 is a perspective view showing an upper rail from FIG. 1.

FIGS. 1 to 3 show an embodiment of the invention. FIG. 1 is a side view of a seat slide apparatus, FIG. 2 is a sectional view taken in line II—II in FIG. 1, and FIG. 3 is a perspective view of an upper rail.

In FIGS. 1 to 3, the seat slide apparatus E for use with vehicles includes a lower rail 10 with the lower surface mounted on the vehicle body and an upper rail 20 having an upper flange 22 and a seat coupler 21.

The upper rail 20 according to the first embodiment is formed by continuously bending a substantially inverted-T plate member. The upper flange 22 is arranged as a lower portion of the upper rail 20 and the lower surface thereof supported on the lower rail 10 through a roller (a roll member). The seat coupler 21 extends upward substantially from the central portion along the width of the upper flange 22 and is mounted on the seat. The lower surface of the upper flange 22 has a surface 23a for sliding contact with the roller 30. The sliding surface 23a is formed as a continuous plane.

A configuration of the first embodiment will be explained in detail below.

The seat slide apparatus E is mounted on a vehicle seat 40 having a seat cushion 41 and a seat back 42.

A pair of right and left lower rails 10 (only one is shown) are fixed in spaced relation to each other along the longitudinal direction (in the directions of arrows F and R in FIG. 1) on the vehicle floor 50. Each lower rail 10 thus includes a base 11 having a substantially U-shaped section fixed on the floor 50 and substantially inverted-U guide members 12, 12 bent inward along the longitudinal direction from the upper side end portions of the base 11.

The upper rail 20 is formed by bending a single thin plate member continuously into a substantially inverted-T shape. The upper rail 20 includes a seat coupler 21 forming a wall having a seat-mounting protrusion 27 to be mounted on a seat reclining device 43 on the seat side and an upper flange 22 having a substantially U-shaped section bent symmetrically about the seat coupler 21 from the lower portion of the seat coupler 21. The seat coupler 21 is coupled in two layers by a plurality of fixing means 28 such as welding or pin caulking. The fixing means 28 are arranged in spaced relation to each other along the longitudinal direction.

The upper flange 22 is also coupled in two layers, and includes a roller slider 23, and hooks 24, 24 formed along the two sides perpendicular to the width longitudinally of the roller slider 23. The slide surface 23a making up the lower surface of the roller slider 23 is in sliding contact with rollers 30 arranged at two points in longitudinally spaced relationship with each other in the base 11 of the lower rail 10. Balls 31, 31 are held respectively between the hooks 24, 24 and the guide members 12, 12 of the lower rail 10. The balls 31, 31 are held with the roller 30 by the retainer 32.

According to the first embodiment, the upper rail 20 is formed by bending a single plate member. Therefore the upper rail 20 can be formed of a single plate member within a series of press work, the process for manufacturing the upper rail 20 is simplified and the cost thereof reduced.

Also, in view of the fact that the hooks 24, 24 of the upper rail 20 are coupled in two layers, the strength is improved. At the same time, the thickness of the plate member can be minimized for reduced weight.

Further, in view of the fact that the sliding surface 23a of the upper rail 20 in contact with the rollers 30 is formed in a continuous plane without any step, the slidability between the upper rail 20 and the rollers 30 is improved.

Figure 4:
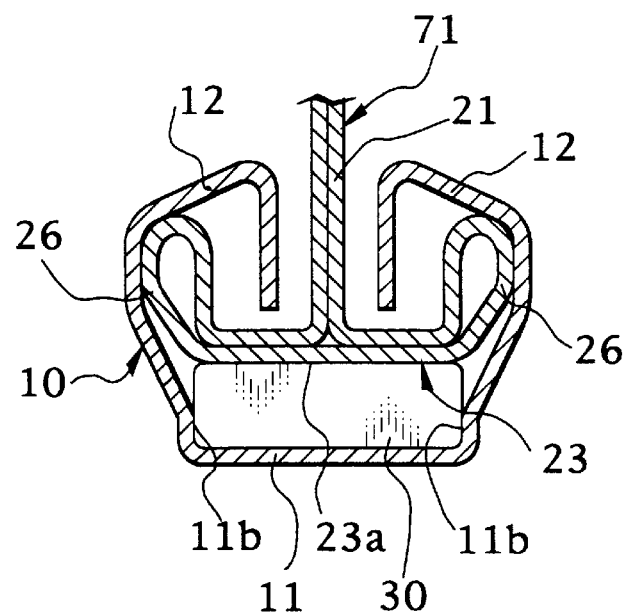
FIG. 4 is a sectional view of a seat slide apparatus similar to FIG. 2 but showing a second embodiment of the invention.
Figure 5:
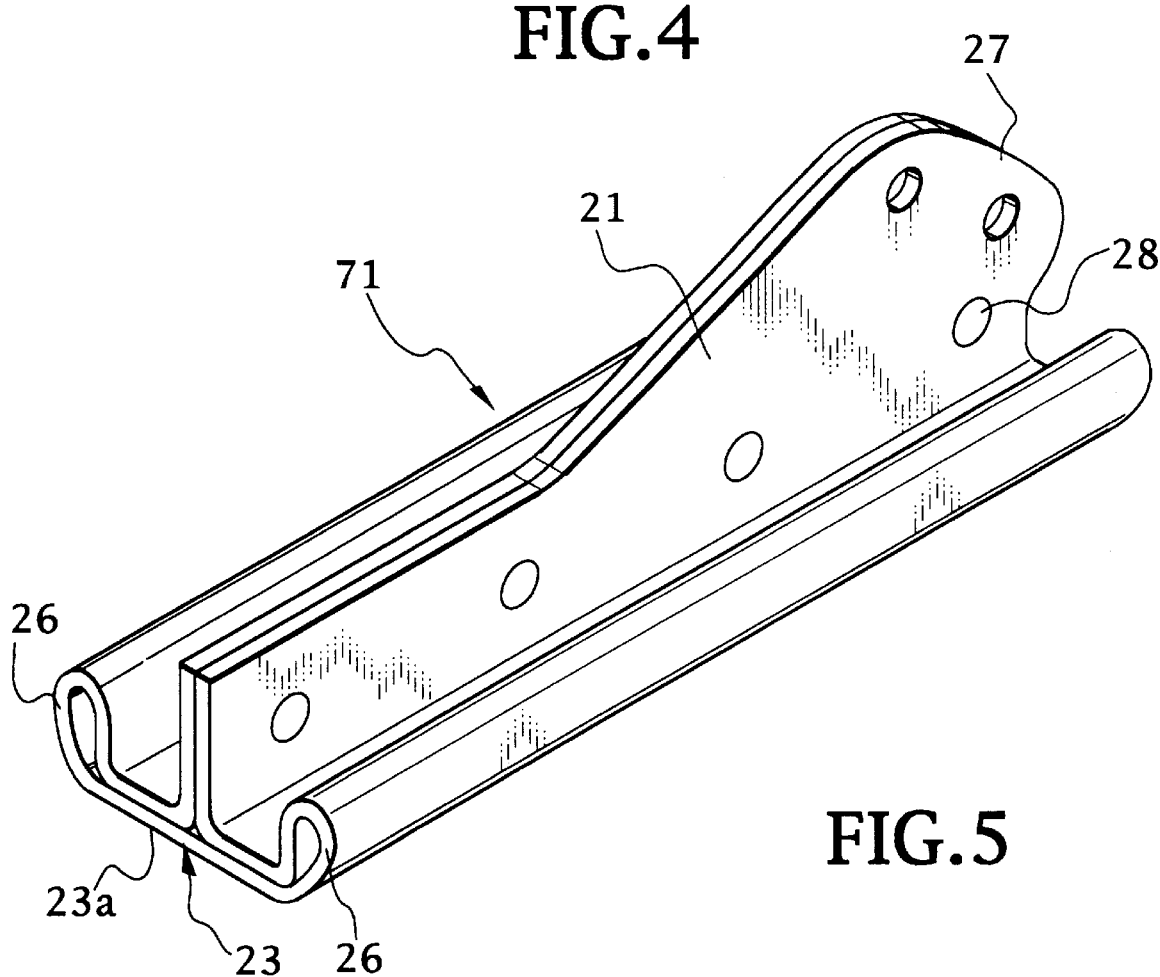
FIG. 5 is a perspective view showing an upper rail from FIG. 4.

FIGS. 4 and 5 show a second embodiment of the invention. FIG. 4 is a sectional view corresponding to FIG. 2 of the first embodiment, and FIG. 5 is a perspective view of an upper rail corresponding to FIG. 3 of the first embodiment. In FIGS. 4 and 5, the same component parts as those in the first embodiment are designated by the same reference numerals, respectively, and will not be described in detail.

According to the second embodiment, curled portions 26, 26 are formed longitudinally on the sides perpendicular to the width of a roller slide member 23 of the upper rail 71. The curled portions 26, 26 are in sliding contact with the inner surfaces of the guide members 12, 12 and the inner surfaces of the upper side edges of the base 11 of the lower rail 10. Also, the curled portions 26, 26 have a function similar to the hooks 24 (FIG. 2) of the first embodiment. The rollers 30 are set in position by roller guides 11b, 11b formed in a manner to hold the rollers 30 on the sides perpendicular to the width of the base 11 of the lower rail 10.

According to the second embodiment, the curled portions 26, 26 prevent the upper rail 71 from loosening laterally or vertically. The upper rail 71 can thus be made to slide smoothly with respect to the lower rail 10. Further, since balls 31 and retainer 32 are eliminated, the production cost is reduced.

According to the second embodiment, the guide members 12, 12 of the lower rail 10 have inclined upper surfaces. In the case where a load is exerted on the upper rail 71 in a direction away from the base 11, the guide members 12 of the lower rail 10 are deformed to a lesser extent for an improved separation resistance.

Figure 6:
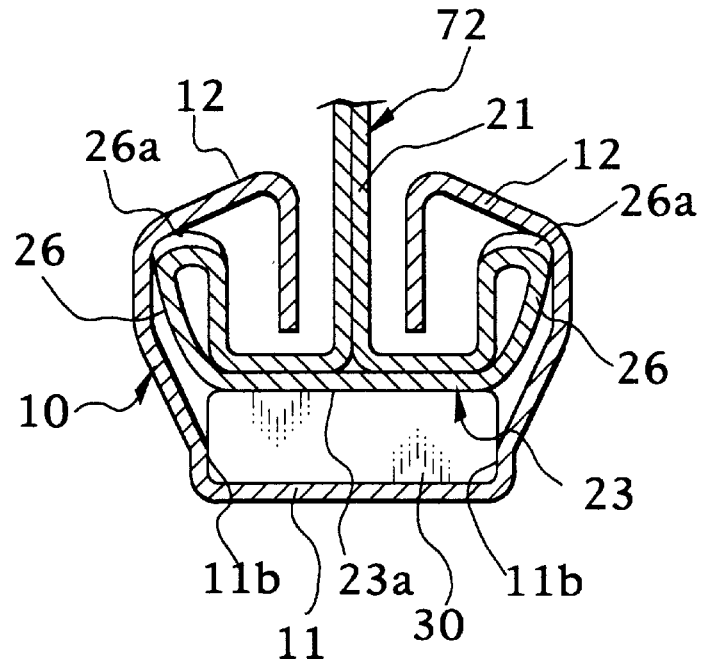
FIG. 6 is a sectional view of a seat slide apparatus similar to FIG. 2 but showing a third embodiment of the invention.

FIG. 6 is a sectional view showing a third embodiment of the invention and corresponds to FIG. 2 showing the first embodiment (or FIG. 4 showing the second embodiment). In FIG. 6, those component parts of the third embodiment identical or similar to the corresponding ones of the second embodiment are designated by the same reference numerals, respectively, and will not be described in detail. According to the third embodiment, the curled portions 26, 26 of the upper rail 72 are formed with protrusions 26a, 26a in longitudinally spaced relation to each other for sliding contact with the inner surfaces of the guide members 12, 12 of the lower rail 10.

The third embodiment having the protrusions 26a, 26a for sliding contact can greatly reduce the sliding resistance of the upper rail 72 against the lower rail 10 and therefore can improve the slidability of the upper rail 72.

Figure 7:
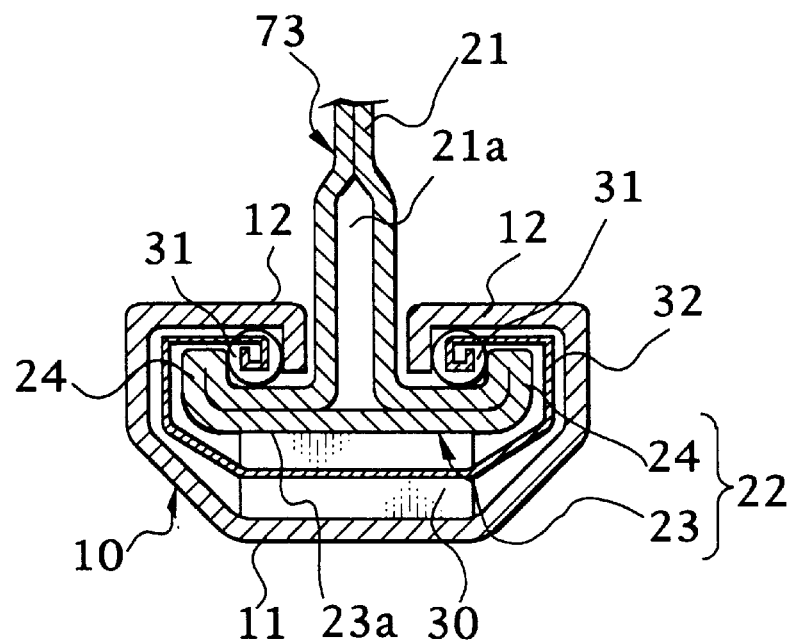
FIG. 7 is a sectional view of a seat slide apparatus similar to FIG. 2 but showing a fourth embodiment of the invention.
Figure 8:
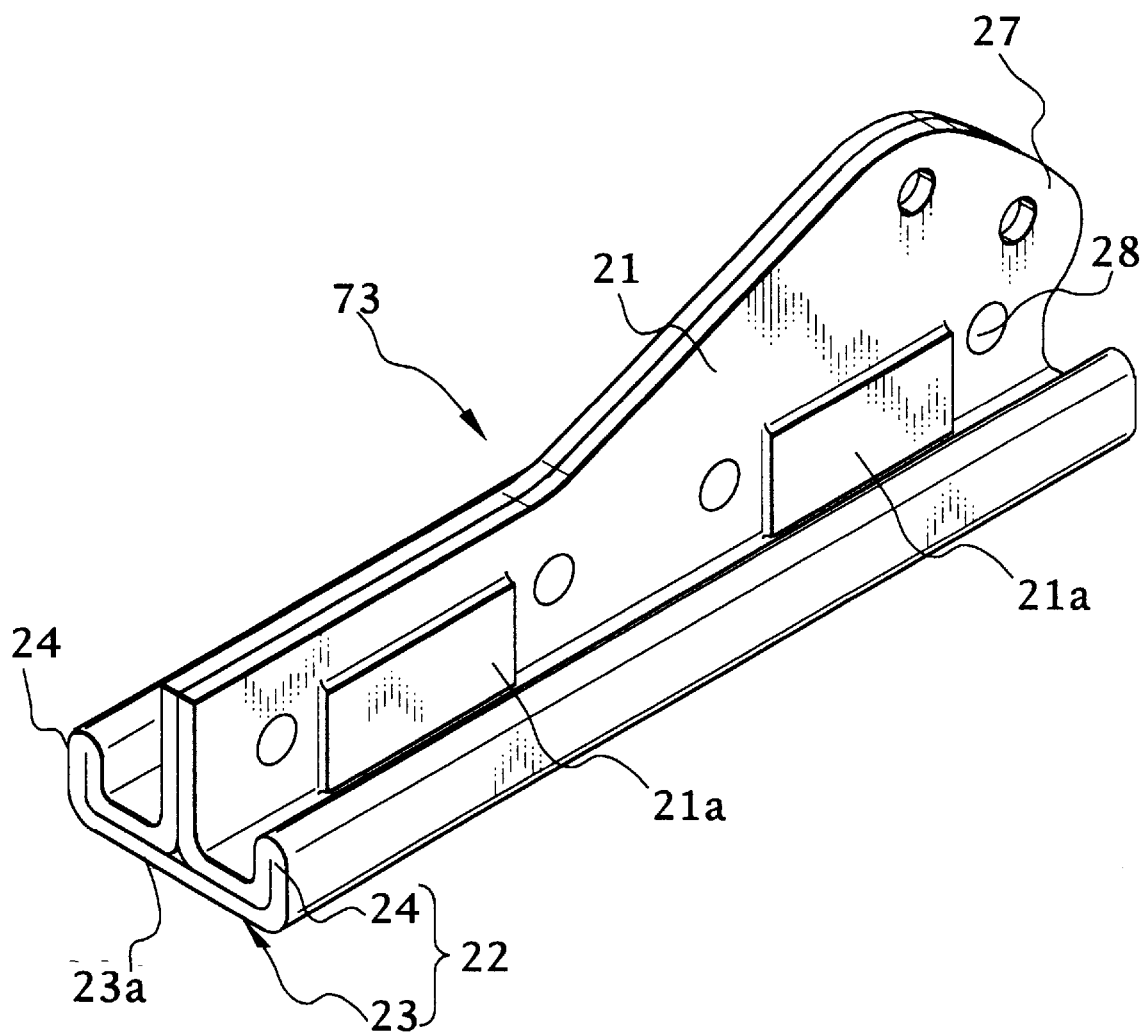
FIG. 8 is a perspective view for explaining an upper rail in FIG. 7.

FIGS. 7 and 8 show a fourth embodiment of the invention. FIG. 7 is a sectional view corresponding to FIG. 2 of the first embodiment, and FIG. 8 is a perspective view of an upper rail corresponding to FIG. 3 of the first embodiment. In FIGS. 7 and 8, those component parts of the fourth embodiment identical or similar to the corresponding ones of the first embodiment are designated by the same reference numerals, respectively, and will not be described in detail.

According to the fourth embodiment, a space 21a is formed in the seat coupler 21 of the upper rail 73. The space 21a is formed longitudinally perpendicular to the width between the two layers of the seat coupler 21. The space i i is formed between the portions of the two layers of the seat coupler 21 not coupled to each other (the portions not having the fixing means 28).

According to the fourth embodiment, the space 21a improves the lateral rigidity of the upper rail 73 for a considerably improved strength of the upper rail 73.

Figure 9:
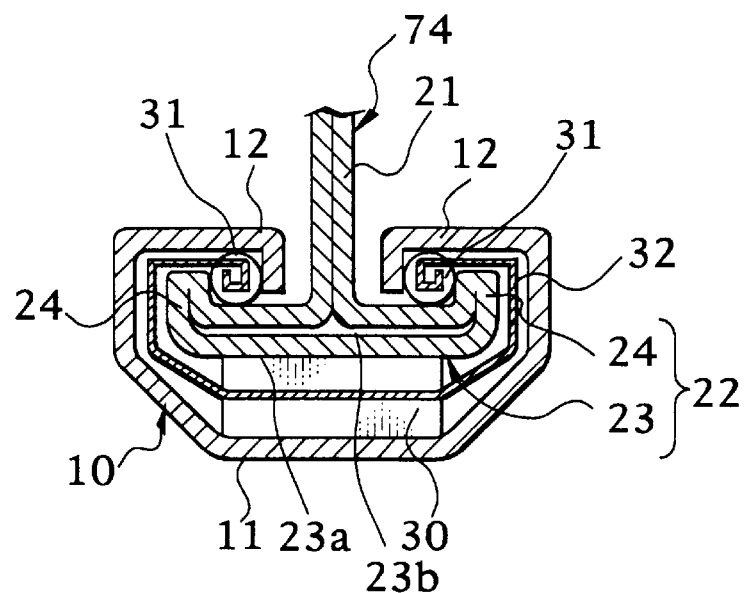
FIG. 9 is a sectional view of a seat slide apparatus similar to FIG. 2 but showing a fifth embodiment of the invention.

FIG. 9 is a sectional view showing a fifth embodiment, and corresponds to FIG. 2 of the first embodiment. In FIG. 9, those component parts of the fifth embodiment identical or similar to the corresponding ones of the first embodiment are designated by the same reference numerals, respectively, and will not be described in detail.

According to the fifth embodiment, a space 23b is formed in the upper flange 22 of the upper rail 74. The space 23b is formed with a predetermined width in longitudinal direction between the two layers of the roller slider 23. The portions of the roller 30 not in sliding contact with the sliding surface 23a of the roller slider 23, such as the longitudinal front and rear ends thereof, are fixedly coupled in two layers by such means as welding.

According to the fifth embodiment, the space 23b functions as a spring-back against the roller 30 and therefore prevents the loosening of the roller 30 for an improved restriction of the roller 30. Also, since the need of selectively assembling the rollers 30 is eliminated, the assembly efficiency is improved for a reduced assembly cost.

Figure 10:
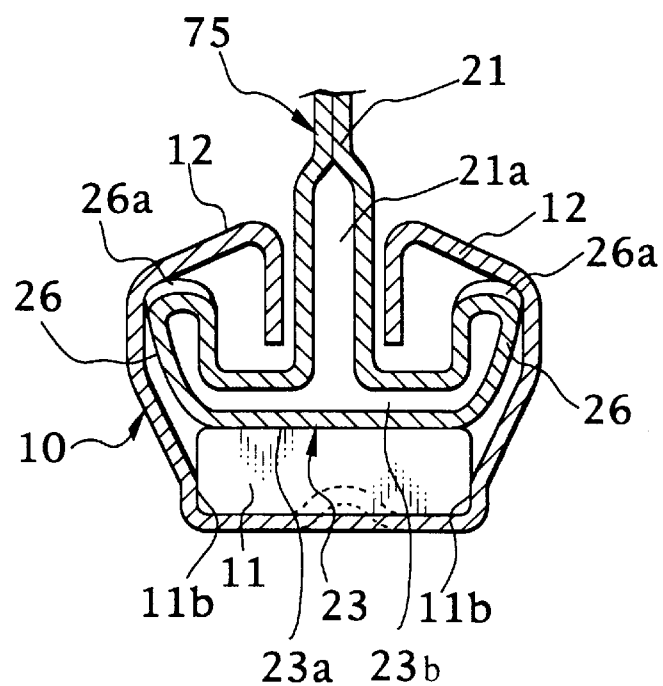
FIG. 10 is a sectional view similar to FIG. 2 showing a combination of the first to fifth embodiments of the invention.

The present invention is applicable in any combination of the embodiments described above. For example, the first to fifth embodiments can be combined as in the case of the upper rail 75 shown in FIG. 10.

Figure 11:
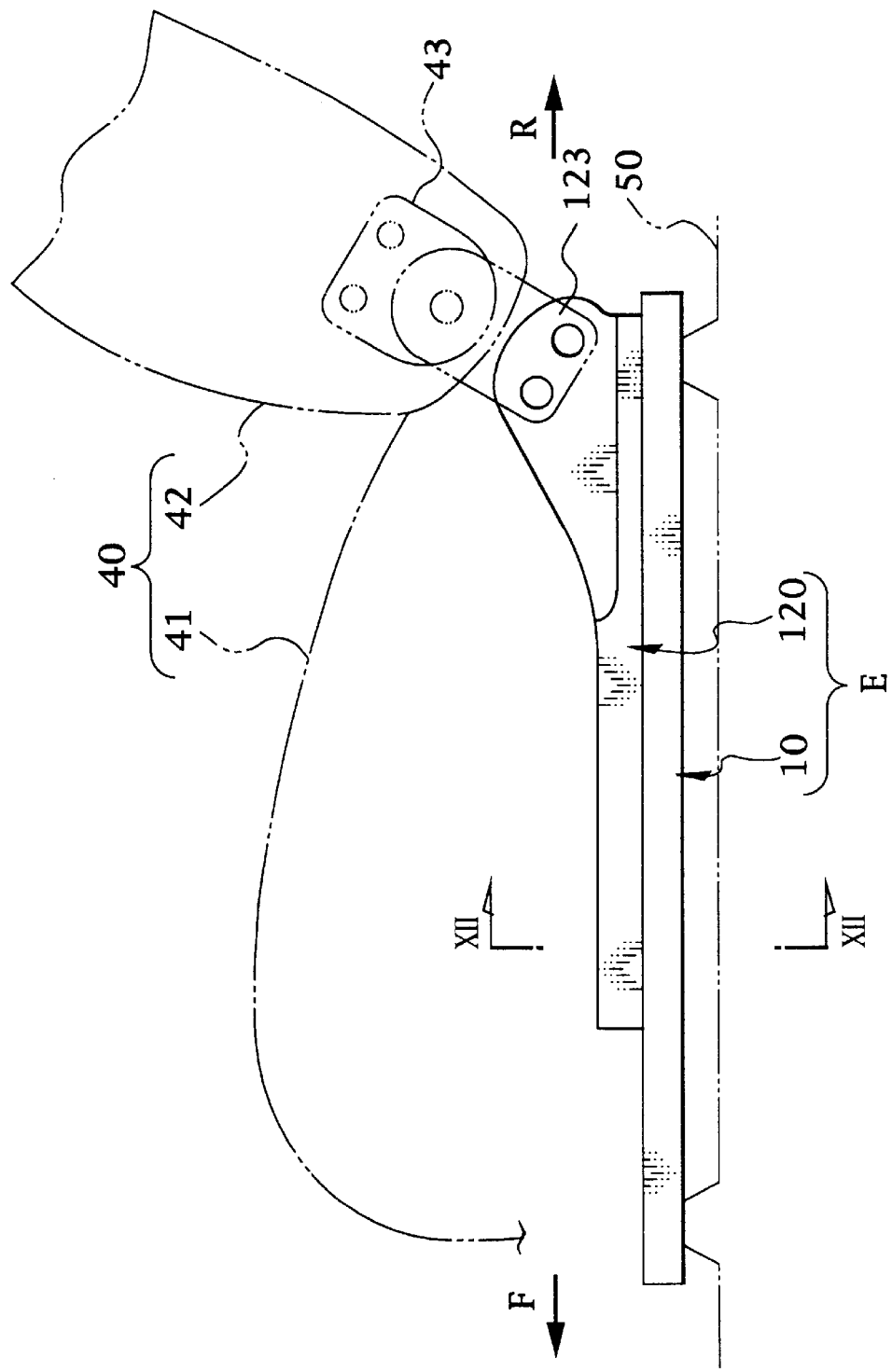
FIG. 11 is a side view showing a seat slide apparatus according to a sixth embodiment of the invention.

FIGS. 11 to 15 show a sixth embodiment of the invention. FIG. 11 is a side view of a seat slide apparatus, FIG. 12 a sectional view taken in line XII—XII in FIG. 11, FIG. 13 a perspective view of an upper rail, FIG. 14 a sectional view of the manner in which the wall layers of the upper rail are coupled, and FIG. 15 a plan view of the state assumed by the plate member at the time of forming the upper rail. In FIGS. 11 to 15, those component parts identical or similar to the corresponding parts in FIGS. 1 to 5 are designated by the same reference numerals, respectively, and will not be described in detail.

In FIGS. 11 to 15, the vehicle seat slide apparatus E includes a lower rail 10 and an upper rail 120 having an upper flange 124 and a wall (seat coupler) 121.

The upper rail 120 according to the sixth embodiment, like the one according to the first embodiment, is formed substantially in inverted-T shape by bending a single plate member continuously. The upper flange 124 is arranged in the lower portion of the upper rail 120 with the lower surface thereof supported on the lower rail 10 through rollers (roll members) 30. The upper flange 124 has a lower surface 124a in sliding contact with the rollers 30.

Figure 13:
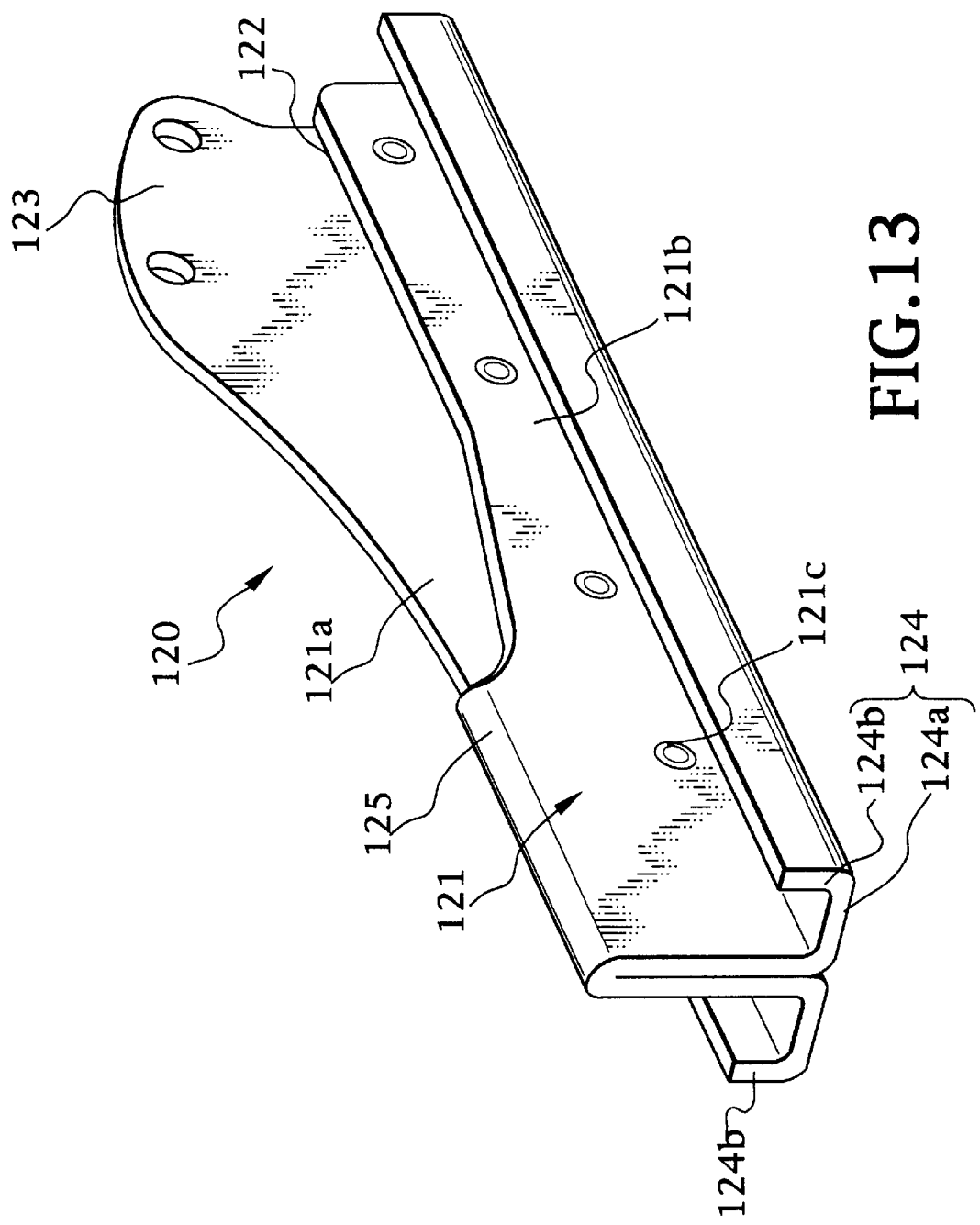
FIG. 13 is a perspective view for explaining an upper rail in FIG. 11.
Figure 15:
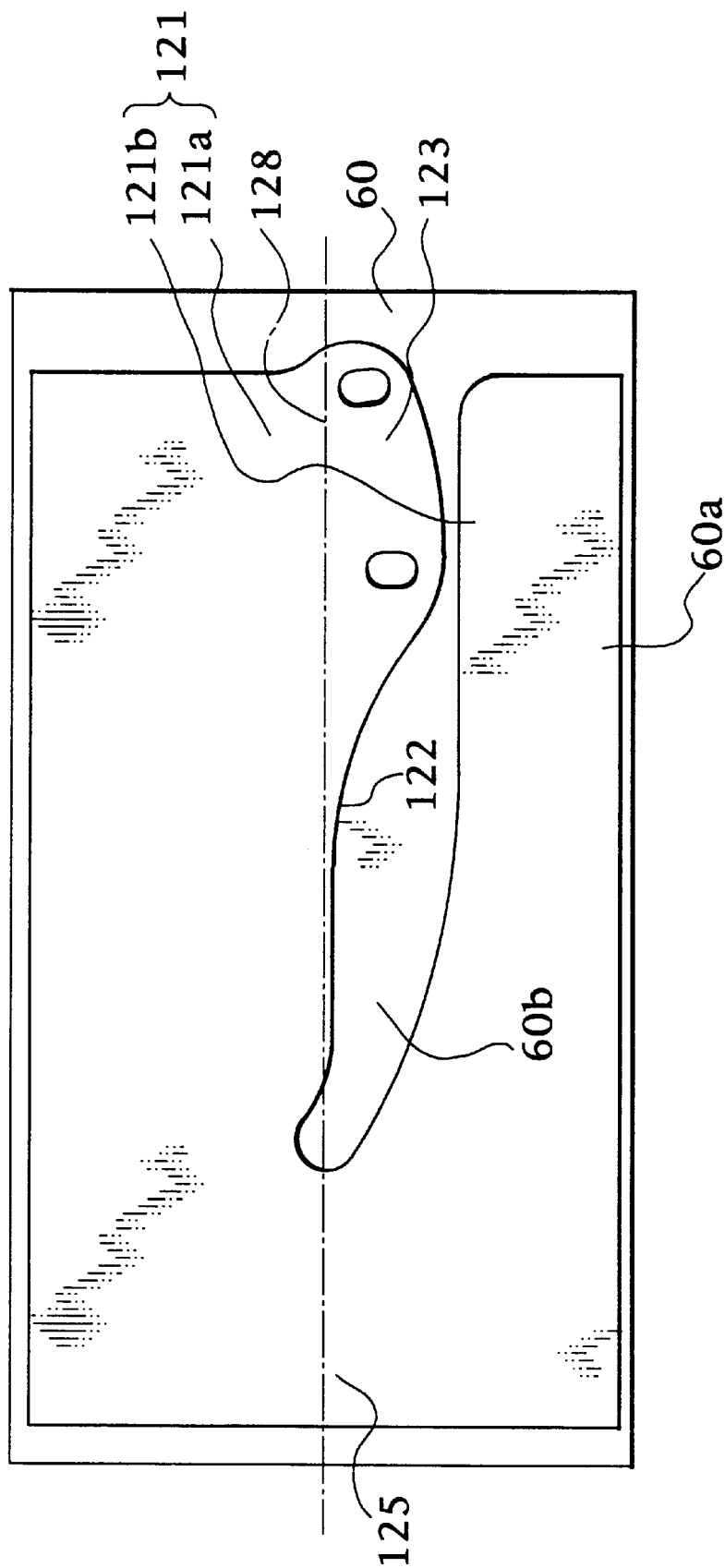
FIG. 15 is a plan view showing the state assumed by the plate member at the time of forming an upper rail in FIG. 11.

The layers of the wall 121 constituting the seat coupler are formed in opposed relation to each other by folding a single plate member 60 (FIG. 15) into two parts along a bending crease 125. The wall 121 extends upward substantially from the central portion along the width of the upper flange 124 and is mounted on the seat. As shown in FIG. 15, the opposed wall portions 121a, 121b in a final state have a notch 122 offset toward the wall portion 121b beyond a bending line 128 forming an extension of the bending crease 125 between the two wall portions 121 (121a, 121b). As shown in FIG. 13, the notch 122 causes the upper portion of the wall portion 121a of the wall 121 to protrude upward beyond the other wall portion 121b. The protruded upper portion of the wall portion 121a thus makes up a seat-mounting protrusion 123 to be mounted on the seat.

A configuration of the sixth embodiment will be described in detail below.

The upper rail 120 is formed by pressing a single plate member 60 into a workpiece 60a (FIG. 15) along the front bending crease 125 and by bending the ends thereof continuously in the shape of substantially inverted-T. In forming the wall 121 folded into two portions laid one on the other, a notch 122 formed offset from the central bending line 128 causes the seat mounting protrusion 123 to be formed on one side of the bending crease 125 of the wall portion 121a. This seat-mounting protrusion 123 is mounted on a seat reclining device 43. An upper flange 124 having a substantially U-shaped section symmetrical with respect to the overlapped portion of the wall 121 is arranged along the longitudinal direction in the lower part of the wall 121.

Figure 14A:
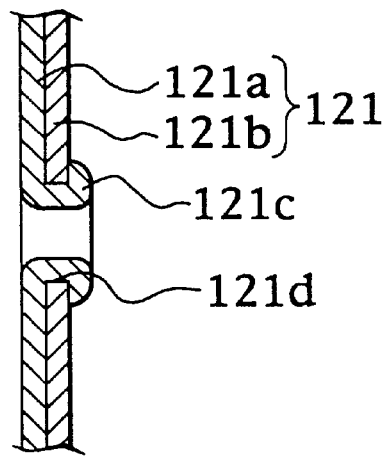
FIG. 14A is a sectional view showing an example of the manner in which the bending creases of an upper rail are coupled.
Figure 14B:
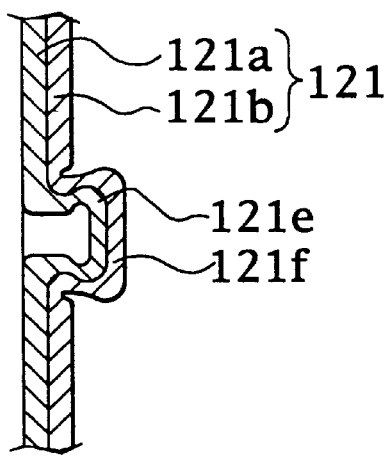
FIG. 14B is a sectional view showing another example of the manner in which the bending creases of an upper rail are coupled.
Figure 14C:
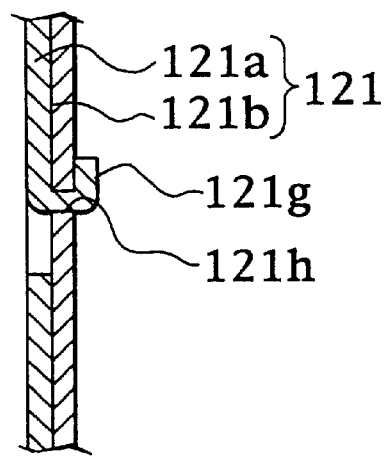
FIG. 14C is a sectional view showing still another example of the manner in which the bending creases of an upper rail are coupled.

The two portions of the wall 121 in to which it is folded are laid one on the other and coupled by the plastic coupling process. FIGS. 14A, 14B, 14C show plastic coupling processes according to embodiments.

FIG. 14A shows a coupling by burring. A burring 121c is formed on the left wall portion 121a and inserted into a caulking hole 121d formed in the right wall portion 121b. The burring 121c protruded from the right wall portion 121b is caulked thereby to couple the two wall portions 121a, 121b.

FIG. 14B shows the manner in which the wall portions are coupled by emboss caulking. Embossments 121e, 121f are press-formed from one side with the wall portions 121a, 121b overlaid one on the other. The embossments 121e, 121f are caulked in such a manner that the outer diameter of the forward end of the inner embossment 121e is increased than the inner diameter of the base of the outer embossment 121f, thereby coupling the wall portions 121a, 121b. The embossments 121e, 121f are caulked over the entire periphery thereof or at a plurality of points, for example, four points.

FIG. 14C shows the manner in which the wall portions are coupled by bending. A hook 121g is formed on the left wall portion 121a and inserted into an insertion hole 121h formed in the right wall portion 121b. The forward end of the hook 121g protruded from the right wall portion 121b is caulked thereby to couple the wall portions 121a, 121b.

The wall portions 121a, 121b may alternatively be coupled by spot welding or pin caulking as in the prior art. In such cases, the welding process or pin insertion process is required.

The upper flange 124 includes a sliding portion 124a constituting the lower surface thereof and hooks 124b, 124b formed longitudinally along the two sides perpendicular to the width of the sliding portion 124a. The sliding portion 124a is arranged in such a manner as to be in sliding contact with the rollers 30 mounted at two points in spaced relation to each other in the base 11 of the lower rail 10. Balls 31, 31 are interposed between the hooks 124b, 124b and the guide members 12, 12, respectively, of the lower rail 10. The balls 31, 31 are held on a retainer 32 together with the rollers 30.

According to the sixth embodiment, as shown in FIG. 15, the workpiece 60a of the upper rail 120 is formed with the notch 122 from the single plate member 60 in press in such a manner as to form the seat-mounting protrusion 23. In this way, the scrapped portion 60b can be greatly reduced, the yield of the plate member 60 is considerably improved, and therefore the production cost is considerably reduced.

Figure 12:
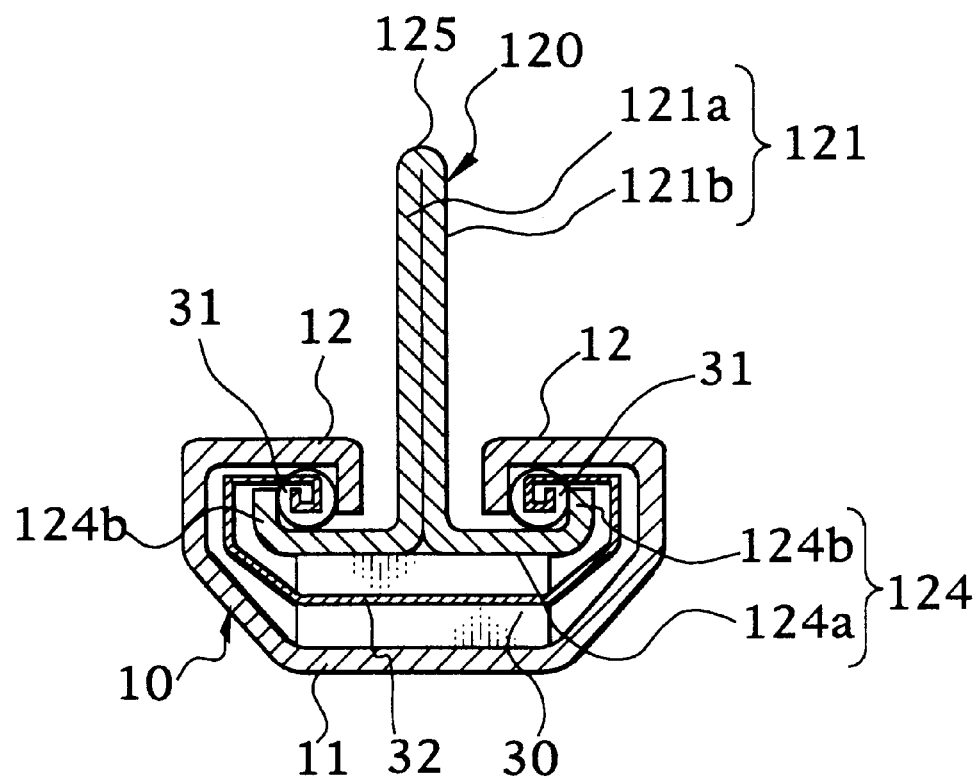
FIG. 12 is a sectional view taken in line XII—XII in FIG. 11.
Figure 16:
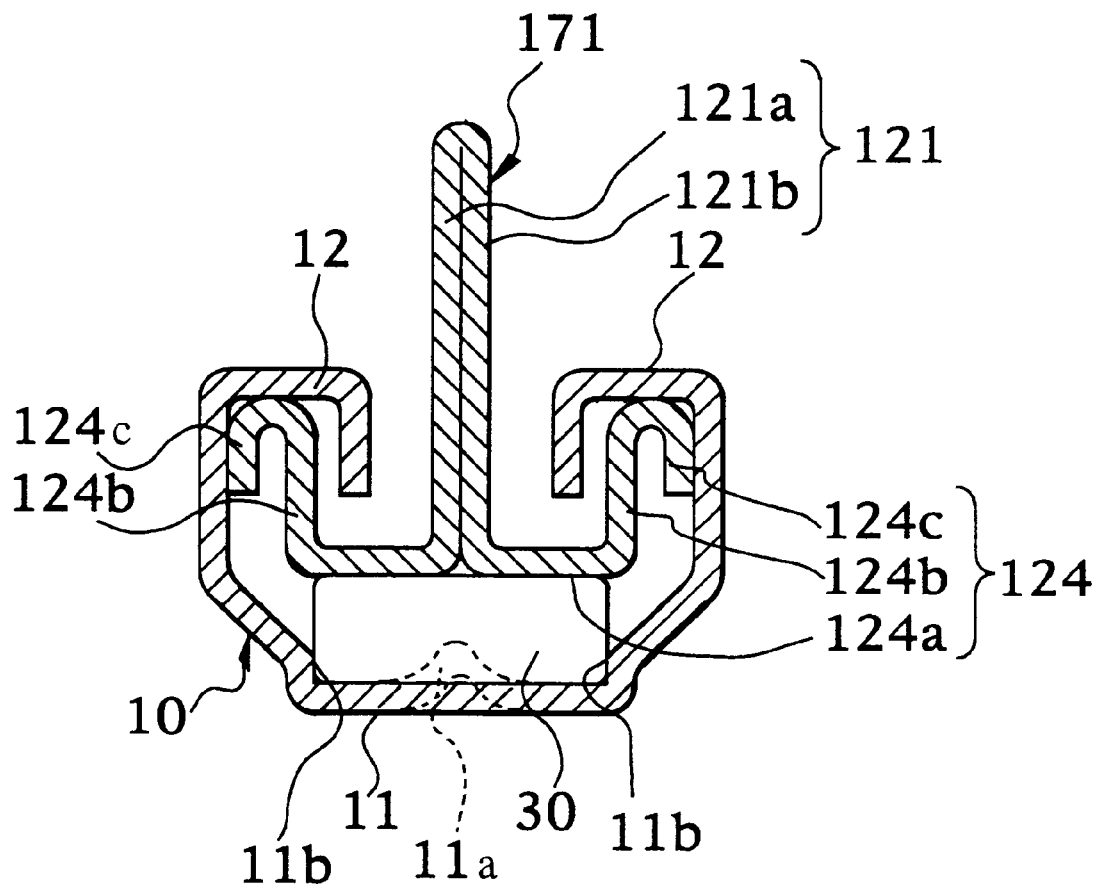
FIG. 16 is a sectional view of a seat slide apparatus similar to FIG. 12 but showing a seventh embodiment of the invention.
Figure 17:
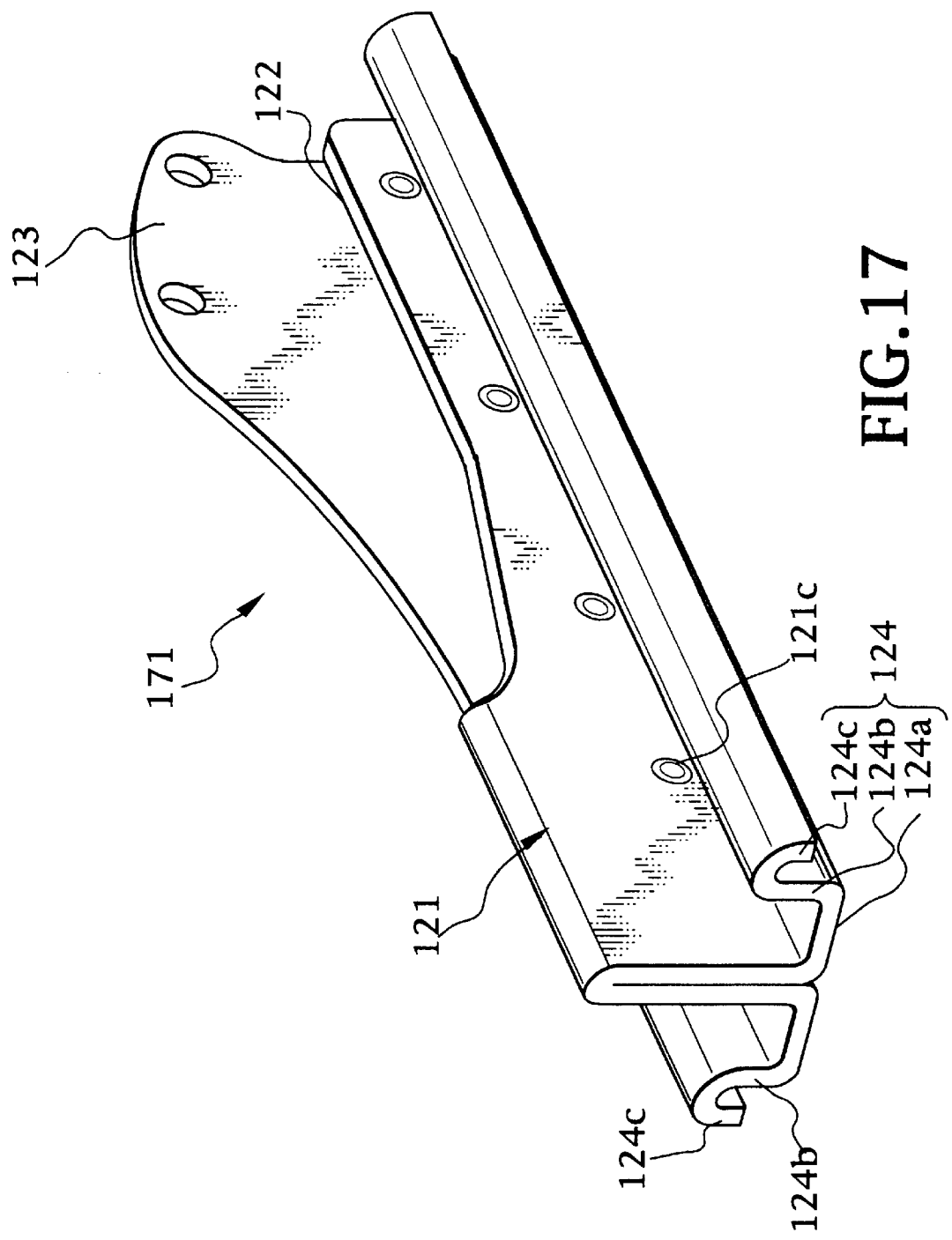
FIG. 17 is a perspective view showing an upper rail in FIG. 16.

FIGS. 16 and 17 show a seventh embodiment of the invention. FIG. 16 is a sectional view corresponding to FIG. 12 showing the sixth embodiment, and FIG. 17 is a perspective view of an upper rail. In FIGS. 16 and 17, those component parts of the seventh embodiment identical or similar to the corresponding component parts of the sixth embodiment are designated by the same reference numerals, respectively, and will not be described in detail.

According to the seventh embodiment, curled portions 124c, 124c are formed in sliding contact with the inner surfaces of the guide members 12, 12 and the side inner surfaces of the base 11 of the lower rail 10 along the two sides perpendicular the width of the hooks 124b, 124b of the upper rail 171. Also, each roller 30 is set in position by roller guides 1b, 11b formed in such positions as to hold the roller 30 on the sides perpendicular to the width of the base 11 and a protrusion 11a formed by being embossed from the lower surface of the base 11 of the lower rail 10. The roller guides 11b restrict the direction in which the roller 30 is rolled.

According to the seventh embodiment, the curled portions 124c, 124c prevent the lateral and vertical loosening of the upper rail 171. As a consequence, the upper rail 171 can smoothly slide along the lower rail 10. Further, since neither the balls 31 nor the retainer 32 are needed, the overall cost is reduced.

The curled portions 124c may not be formed over the entire length of the upper rail 171 but within a predetermined range of the longitudinal intermediate portion or in a plurality of numbers in spaced relation to each other. As another alternative, the curled portions 124c may be formed in laterally asymmetric shapes. In the process, the portions in sliding contact can be reduced for a smaller sliding resistance, so that the upper rail 171 can slide more smoothly with respect to the lower rail 10.

Figure 18:
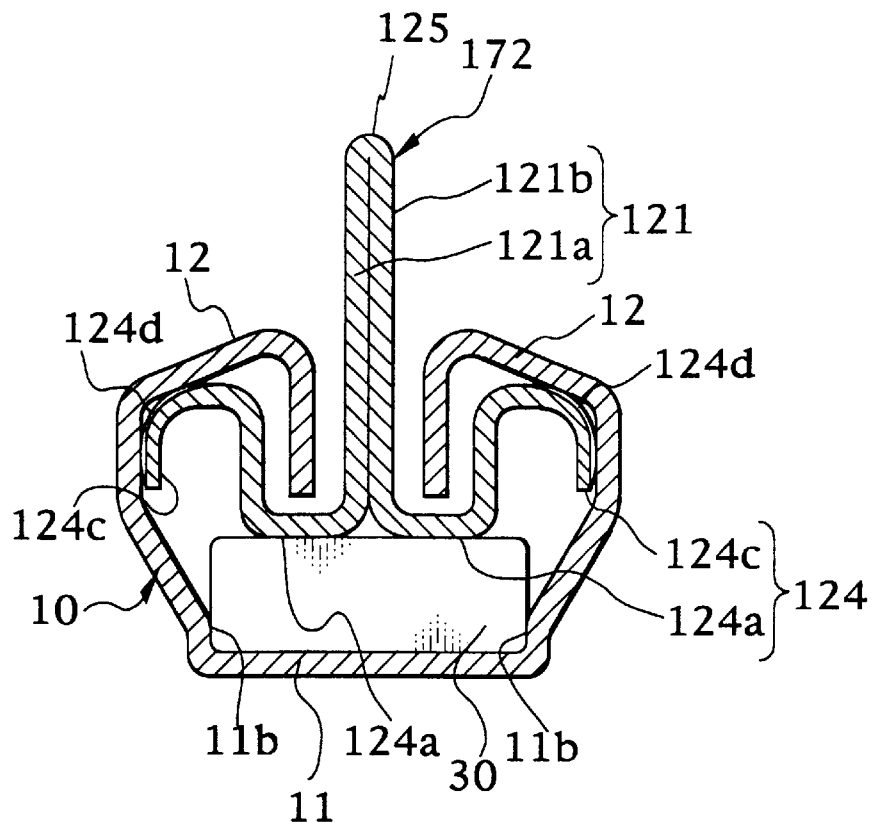
FIG. 18 is a sectional view of a seat slide apparatus similar to FIG. 12 showing an eighth embodiment of the invention.

FIG. 18 is a sectional view showing an eighth embodiment of the invention, and corresponds to FIG. 12 showing the sixth embodiment (or FIG. 16 showing the seventh embodiment). In FIG. 18, those component parts identical or similar to the corresponding component parts of the seventh embodiment are designated by the same reference numerals, respectively, and will not be described in detail.

According to the eighth embodiment, the curled portions 124c, 124c of the upper rail 172 are formed with a plurality of protrusions 124d, 124d in longitudinally spaced relation to each other for sliding contact with the inner surfaces of the guide members 12, 12 of the lower rail 10. According to the eighth embodiment, the sliding protrusions 124d, 124d considerably reduce the sliding resistance of the upper rail 172 against the lower rail 10, thereby further improving the slidability of the upper rail 172.

According to the eighth embodiment, the upper surfaces of the guide members 12, 12 of the lower rail 10 are so inclined that the deformation of the guide members 12, 12 of the lower rail 10 is reduced under a load which may be imposed in such a direction as to separate the upper rail 172 from the lower rail 10, thereby improving the separation resistance.

Figure 19:
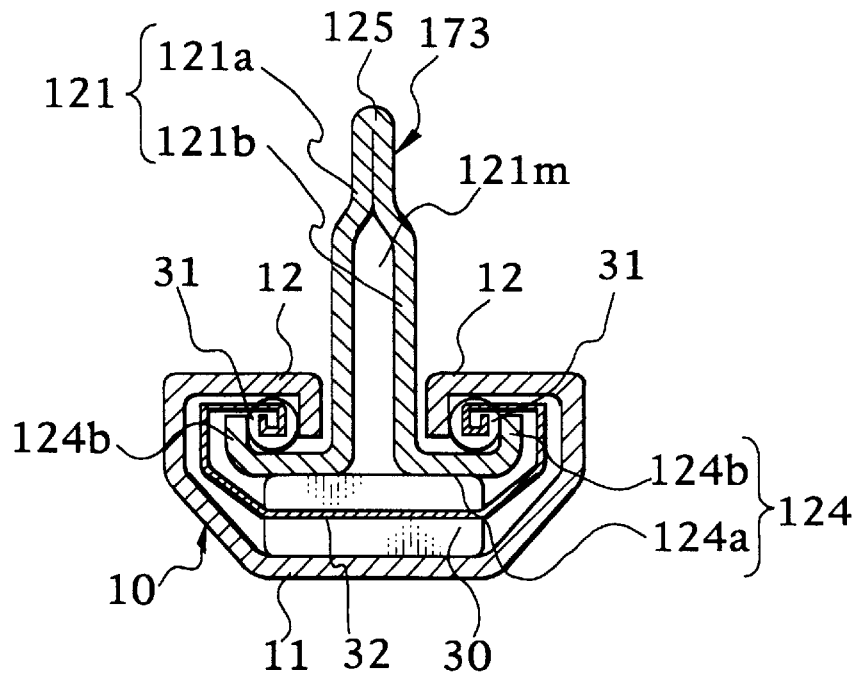
FIG. 19 is a sectional view of a seat slide apparatus similar to FIG. 12 but showing a ninth embodiment of the invention.
Figure 20:
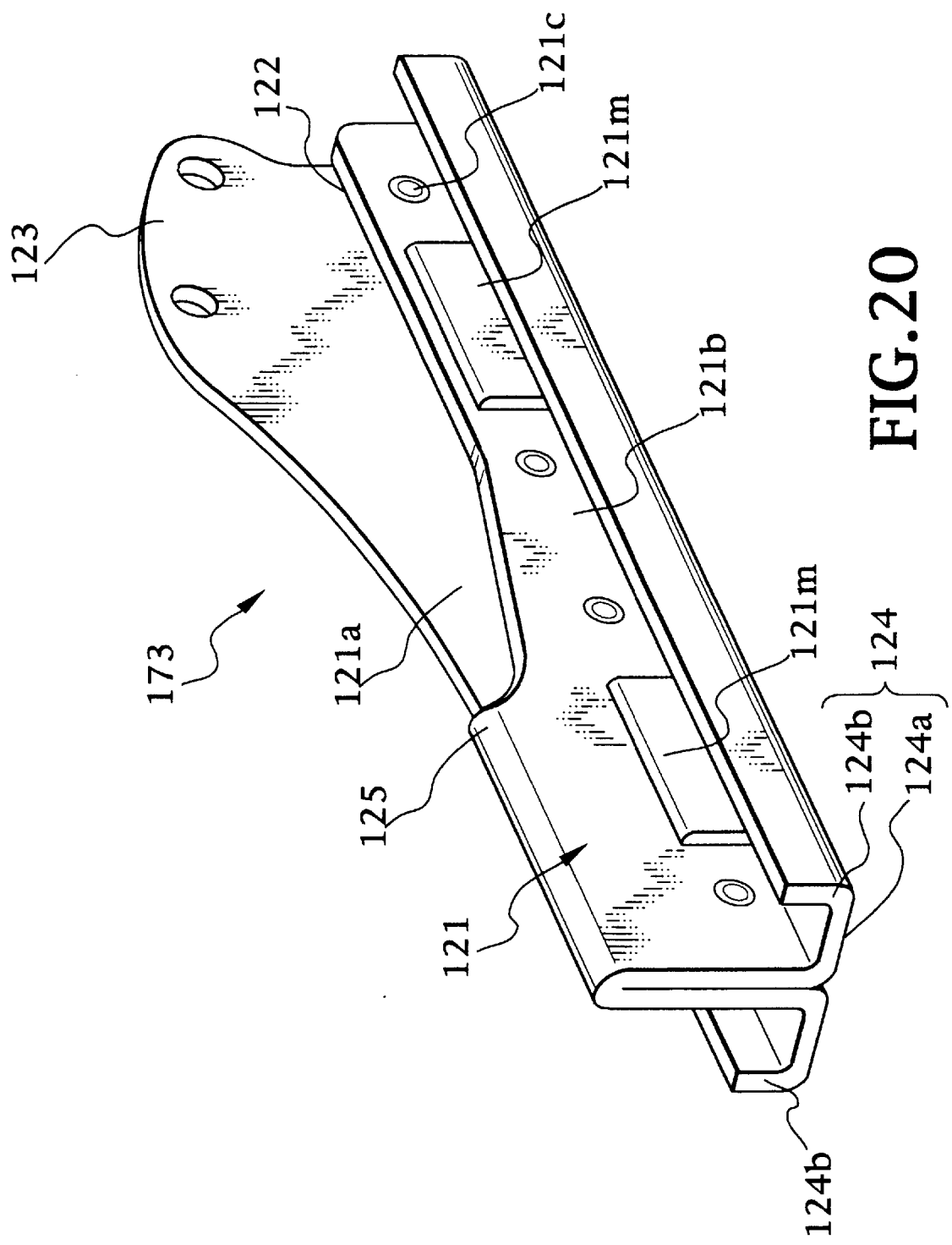
FIG. 20 is a perspective view showing an upper rail in FIG. 19.

FIGS. 19 and 20 show a ninth embodiment of the invention. FIG. 19 is a sectional view corresponding to FIG. 12 showing the sixth embodiment, and FIG. 20 is a perspective view of an upper rail corresponding to FIG. 13 showing the sixth embodiment. In FIGS. 19 and 20, those component parts identical or similar to the corresponding component parts of the sixth embodiment are designated by the same reference numerals, respectively, and will not be described in detail.

According to the ninth embodiment, an internal space 121m is formed longitudinally in the direction perpendicular to the width of the wall portions 121a, 121b of the upper rail 173. The space 121m is formed between the wall portions 121a, 121b overlaid and coupled with each other.

According to the ninth embodiment, the lateral rigidity of the upper rail 173 can be improved by the space 121m thereby to improve the strength of the upper rail 173 considerably.

Figure 21:
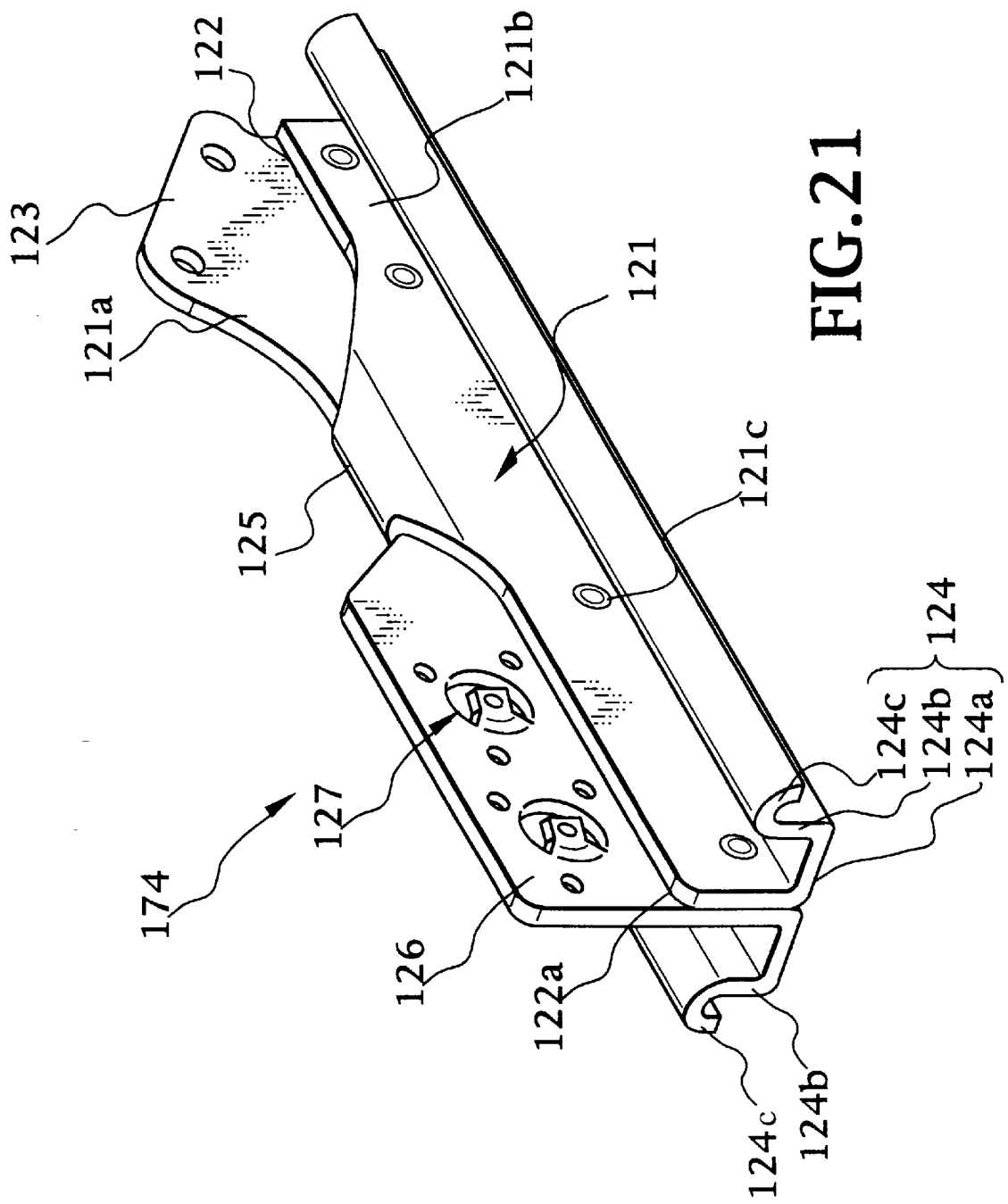
FIG. 21 is a perspective view of a seat slide apparatus similar to FIG. 13, but showing a tenth embodiment of the invention.
Figure 22:
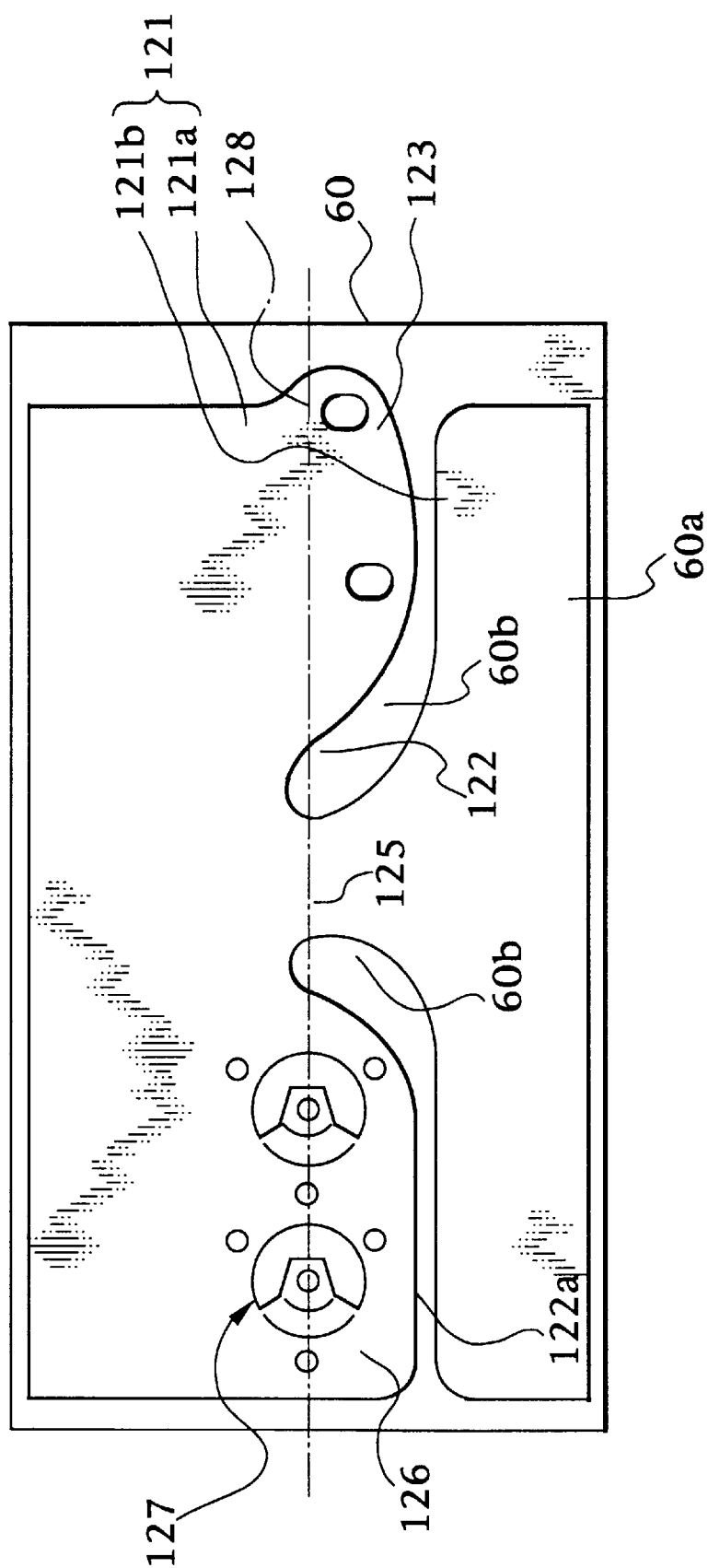
FIG. 22 is a plan view similar to FIG. 21, but showing the state assumed by the plate member at the time of forming an upper rail in FIG. 21.

FIGS. 21 and 22 show a tenth embodiment of the invention. FIG. 21 is a perspective view of an upper rail corresponding to FIG. 13 showing the sixth embodiment, and FIG. 22 is a plan view showing the state assumed by the plate member at the time of forming the upper rail and corresponds to FIG. 15 showing the sixth embodiment. In FIGS. 21 and 22, those component parts identical or similar to the corresponding component parts in the sixth embodiment are designated by the same reference numerals, respectively, and will not be described in detail.

The upper rail 174 according to the tenth embodiment is used for a seat slide apparatus mounted on the vehicle seat 40 having a seat lifter (not shown) making possible vertical adjustment of a seat cushion 41.

The upper rail 174, as shown in FIG. 22, is configured of a single plate member, which is first formed into a workpiece 60a and bent along a crease 125, with the entire side ends thereof bent substantially into the shape of inverted-T. A notch 122 is formed in the rear portion of the plate member 60 (longitudinally of the seat) in a position offset from the central bending line 128 toward the wall portion 121b. When the plate member 60 is folded into two portions along the crease 125, this notch 122 makes it possible to protrude the rear upper portion of the other wall portion 121a with respect to the crease 125 upward beyond the wall portion 121b. A seat-mounting protrusion 123 mountable on the seat reclining device 43 is thus formed. Also, a notch 122a is formed in the front portion of the plate member 60 (longitudinally of the seat) at a position offset from the bending line 128 toward the wall portion 121b. When the plate member 60 is folded into two portions along the crease 125, this notch 122a makes it possible to form a lifter-mounting protrusion 126 upward beyond the wall portion 121b in the front portion of the other wall portion 121a with respect to the crease 125. The upper flange 124, like the corresponding one of the sixth embodiment, is bent symmetrically about the coupling in the lower parts of the wall portions 121a, 121b and formed longitudinally to have a substantially U-shaped section. The lifter-mounting protrusion 126 is formed with means 127 for mounting the component parts of the lifter. As an alternative, a lifter-mounting protrusion may be formed on the wall portion 121b, and a seat-mounting protrusion on the wall portion 121a.

According to the tenth embodiment, an upper rail 174, a supporting member for the seat reclining device 43 and mounting means for the component parts of the seat lifter of a seat slide apparatus can be formed of a single plate member 60. The functions can thus be consolidated for a reduced number of required component parts. Also, the fact that the upper rail 174, the supporting member and the component-mounting means can be produced from a single plate member 60 by a series of press-forming steps can considerably improve the yield and reduce the scrapped portion 60b.

Figure 23:
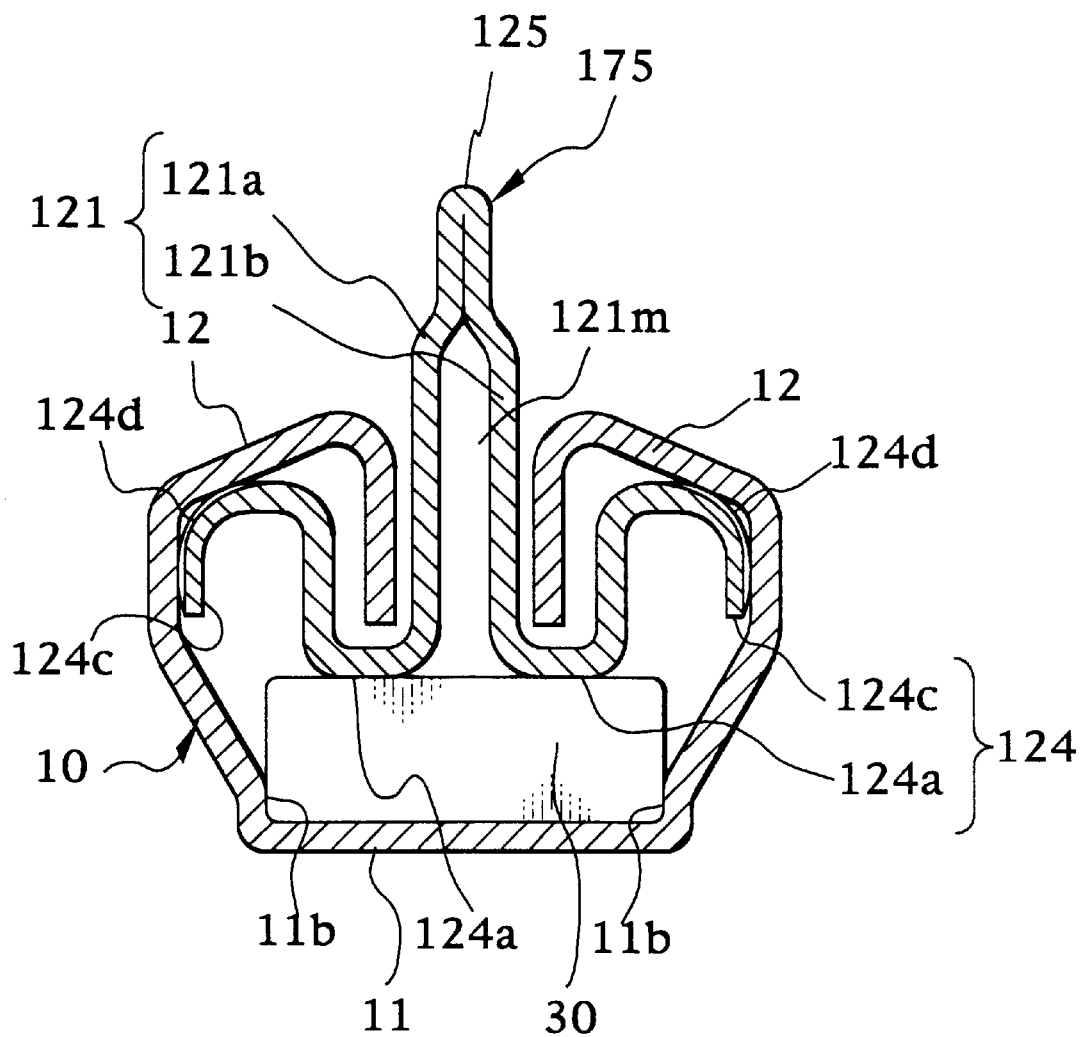
FIG. 23 is a sectional view of a combination of the sixth to tenth embodiments similar to FIG. 12.

The invention is applicable to any appropriate combination of the embodiments described above. For example, as shown by the upper rail 175 of FIG. 23, the sixth to tenth embodiments can be combined in their entirety.

Further, the first and sixth embodiments can be combined with each other. In FIG. 2, for example, the portions of the upper flange 22 other than the roller slider 23 are configured in such a manner that an end of the folded plate member is in opposed relation to the other end thereof. In this way, the first and sixth embodiments can be combined to form an upper rail.

What is claimed is:

1. A seat slide apparatus comprising:
   a lower rail mountable on a vehicle body;
   an upper rail including an upper flange and a seat-coupling means, said upper flange having a substantially inverted-T section having a lower layer portion, two upper layer portions and two opposite portions;
   said lower layer portion including an integral continuous lower surface extending laterally;
   said upper layer portions folded from lateral ends of said lower layer portion and extending inwardly;
   said opposite portions bent from said upper layer portions and extending upward substantially;
   said lower surface of said lower layer portion slidably supported on said lower rail through at least a roll member; and
   said seat-coupling means extending upward substantially from at least one of said opposite portions and mountable on a vehicle seat.

2. The seat slide apparatus according to claim 1, wherein said lower rail includes guide means extending longitudinally along the sides perpendicular to the width of said lower rail, and said upper flange includes curled portions in sliding contact with the inner surfaces of said guide means, respectively, along the sides perpendicular to the width of said upper flange.

3. The seat slide apparatus according to claim 2, wherein each of said curled portions has a plurality of sliding conductible protrusions formed in longitudinally spaced relation to each other.

4. The seat slide apparatus according to claim 1, wherein said seat-coupling means has an internal space.

5. The seat slide apparatus according to claim 1, wherein said upper flange has a longitudinally-extending internal space.

6. A seat slide apparatus comprising:
   a lower rail mountable on a vehicle body;
   an upper rail including an upper flange and seat-coupling means;
   said upper flange having a substantially inverted-T section formed by bending a single plate member and having a lower surface slidably supported on said lower rail through at least a roll member;
   said seat-coupling means extending upward substantially from a central portion along the width of said upper flange and mountable on a vehicle seat;
   said seat-coupling means including two opposed wall portions formed by folding said single plate member along a crease;
   one of said opposed wall portions in unfolded state having a first notch offset to the other of said wall portions from an extension line of said crease; and
   said first notch causing an upper portion of the other of said wall portions to protrude above said one of said wall portions, thereby forming a protrusion mountable on the vehicle seat.

7. The seat slide apparatus according to claim 6, wherein said two opposed wall portions are coupled to each other by the plastic coupling process.

8. The seat slide apparatus according to claim 6, wherein said lower rail has guide means extending longitudinally along the sides perpendicular to the width thereof, and said upper flange has curled portions in sliding contact with the inner surfaces of said guide means on each of the sides perpendicular to the width of said upper flange.

9. The seat slide apparatus according to claim 8, wherein each of said curled portions has a plurality of sliding conductible protrusions in longitudinally spaced relation to each other.

10. The seat slide apparatus according to claim 6, wherein said seat-coupling means has an internal space formed between said two wall portions.

11. The seat slide apparatus according to claim 6, wherein one of said wall portions includes a second notch offset to the other of said wall portions from an extension line of said crease, said second notch causing an upper portion of the other of said wall portions to protrude above said one of said wall portions, thereby forming a protrusion mountable on a seat lift means.

12. A seat slide apparatus comprising:
   a lower rail having a base and laterally spaced side walls, said side walls having laterally inwardly extending portions at upper ends spaced from said base;
   an upper rail including an upper flange having a substantially inverted T-shaped section;
   said T-shaped section being formed by bending a single plate member, said T-shaped section having an integral continuous lower surface slidably supported on said lower rail through at least one support member; and
   said T-shaped section being coupled in two layers, said upper rail having a seat coupling portion extending upward substantially from a central portion of said T-shaped section, and extending laterally between the side walls of said lower rail.

13. The seat slide apparatus according to claim 12, wherein said T-shaped section has curved portions associated with said laterally inwardly extending portions of said lower rail.

14. The seat slide apparatus as recited in claim 13, wherein said curved portions have outwardly extending protrusions, said protrusions extending toward said laterally inwardly extending portions of said lower rail away from the remainder of said curled portions.

15. A seat slide apparatus comprising:
   a lower rail having a base and laterally spaced side walls, said side walls having laterally inwardly extending portions at upper ends spaced from said base;
   an upper rail including an upper flange having a substantially inverted T-shaped section, said T-shaped section being formed by bending a single plate member;
   said T-shaped section having a lower surface slidably supported on said lower rail through at least one support member; and
   said lower surface having a central gap formed by two opposed folded portions of said single plate member, said upper rail having a seat coupling portion extending upward substantially from a central portion of said T-shaped section and extending laterally between the side walls of said lower rail.

16. A method of forming a seat slide apparatus comprising the steps of:
   (1) providing a lower rail having laterally spaced sides and laterally inwardly extending portions;
   (2) providing an upper rail having a substantially inverted-T section formed by bending a single plate member, the inverted-T section having a lower layer portion, two upper layer portions and two opposite portions, the lower layer portion including an integral continuous lower surface extending laterally, the upper layer portions folded from lateral ends of the lower layer portion and extending inwardly, the opposite portions bent from the upper layer portions and extending upward substantially; and
   (3) positioning the upper rail within the lower rail, the lower surface of the lower layer portion slidably supported on the lower rail through at least a roll member.

17. A method of forming a seat slide apparatus comprising the steps of:
   (1) providing a lower rail having laterally spaced sides and laterally inwardly extending portions;
   (2) providing an upper rail having a substantially inverted-T section formed by bending a single plate member, the upper rail including an upper flange with a lower surface and seat-coupling means extending upward substantially from a central portion along the width of the upper flange and mountable on a vehicle seat, the seat-coupling means including two opposed wall portions formed by folding the single plate member along a crease thereof, the opposed wall portions in unfolded state having a notch offset to one of the wall portions from an extension line of the crease, the notch causing an upper portion of the other of the wall portions to protrude above said one of the wall portions, thereby forming a protrusion mountable on the vehicle seat; and
   (3) positioning said upper rail within said lower rail, the lower surface of the lower layer portion slidably supported on the lower rail through at least a roll member.

* * * * *